Jan. 17, 1939.  F. W. CALDWELL  2,144,423
PROPELLER DRIVE
Filed May 19, 1936   2 Sheets-Sheet 1

INVENTOR.
FRANK W. CALDWELL
BY Harris G. Luther
ATTORNEY

Jan. 17, 1939.  F. W. CALDWELL  2,144,423
PROPELLER DRIVE
Filed May 19, 1936  2 Sheets-Sheet 2

INVENTOR.
FRANK W. CALDWELL
BY Harris G. Luther
ATTORNEYS.

Patented Jan. 17, 1939

2,144,423

UNITED STATES PATENT OFFICE 2,144,423

PROPELLER DRIVE

Frank W. Caldwell, Hartford, Conn., assignor to United Aircraft Corporation, East Hartford, Conn., a corporation of Delaware Application May 19, 1936, Serial No. 80,550

1 Claim. (Cl. 170—162)

This invention relates to improvements in propeller drives and particularly to a reasonable drive for a controllable pitch aeronautical propeller.

An object of the invention lies in the provision of a releasable drive of the character specified whereby the driving connection between the engine and the propeller may be released and the propeller allowed to rotate without rotating the engine.

A further object resides in the provision of a releasable propeller drive of the character specified wherein the drive between the propeller and the engine may be manually released or engaged at will.

A still further object resides in the provision of a releasable propeller drive of the character specified wherein the drive releasing and engaging means is applied to an element of the driving connection between the engine and propeller where the drive forces are at their minimum value.

An additional object resides in the provision of a releasable connection in the drive between the engine and the propeller to permit the propeller to rotate freely or free wheel with respect to the engine so that the propeller drag of a dead engine may be reduced to the minimum and the propeller prevented from rotating the engine when in a defective condition, and also to prevent the propeller from over-revving an engine during a high velocity dive and permit the use of a propeller as a brake to slow down the speed of an airplane during a prolonged dive. Other objects and advantages will be more particularly pointed out hereinafter or will become apparent as the description proceeds.

In the accompanying drawings wherein like reference numerals are used to designate similar parts throughout, there is illustrated what is now considered to be the preferred form of the idea of the invention. The drawings, however, are for the purpose of illustration only and are not to be taken as limiting the invention, the scope of which is to be measured entirely by the scope of the appended claim.

In the drawings, Fig. 1 is an elevational view of a propeller, a fragmentary portion of an engine, and the driving connection between the engine and the propeller, certain portions being broken away and shown in section to better illustrate the construction thereof.

Figure 1:
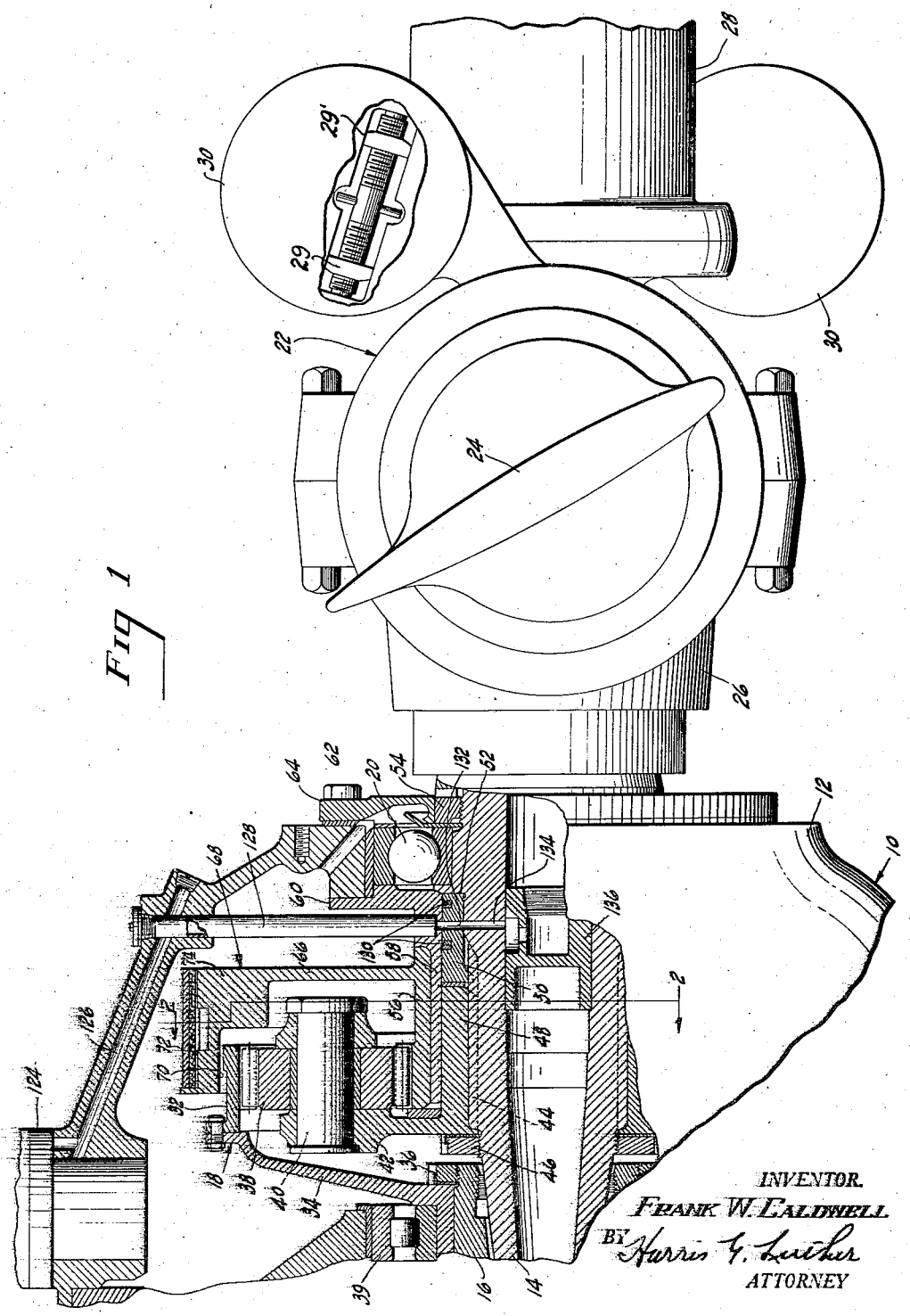

Referring to the drawings in detail, the numeral 10 generally indicates an engine which may be a radial internal combustion engine frequently used for the propulsion of aircraft, but within the scope of the invention may be any other type of power plant suitable to drive an aeronautical propeller.

The engine illustrated has a fixed nose portion 12 through which extends a rotatable propeller drive shaft 14 drivingly connected to the engine power shaft or crankshaft 16 by a suitable reduction gearing generally indicated at 18.

The propeller shaft 14 is supported in the nose section 12 by means of an anti-friction ball bearing 20 which serves to center the propeller shaft in the nose section and also to transmit the propeller thrust load to the engine and the airplane upon which the engine is mounted.

The propeller, generally indicated at 22, is a controllable pitch type well-known to the art and has its blades 24 rotatably mounted in the hub portion 26 so that the blades may be rotated about their longitudinal axes to change the pitch angle thereof. The blades are moved in one direction of rotation by a suitable hydraulic mechanism, generally indicated at 28, and are moved in the opposite direction by centrifugally actuated counterweights 30, in the form of propeller illustrated the hydraulic mechanism being used to move the blades toward their low pitch position and the counterweights 30 tending to move the blades toward their high pitch position. A propeller of this type is particularly illustrated and described in Patent No. 2,032,255 issued February 25, 1936, to F. W. Caldwell. The limiting low and high pitch positions of the blades are definitely determined by a pair of limit stops 29, 29' included in the connection between the movable element of the hydraulic mechanism 28 and the counterweights 30. If, for any reason, the engine upon which the propeller is mounted fails or is stopped, the pressure acting upon the hydraulic mechanism 28 would be relieved and the counterweights 30 would move the propeller blades to their limiting high pitch position during the slowing down of the engine before it was completely stopped or during free-wheeling of the propeller.

The shaft 14 is driven from the power shaft 16 through the planetary reduction gear train generally indicated at 18 as stated above. An annular ring gear 32 is mounted upon the forward end of the power shaft 16 by means of a bell housing 34 secured upon the splined forward end of the drive shaft by means of a thrust nut 36 and centered with respect to the fixed parts of the engine by means of a suitable anti-friction bearing 39. The annular drive gear 32 is provided internally thereof with gear teeth which mesh with the teeth of a plurality of planetary gears 38 mounted upon axles 40 carried by a cage 42 drivingly connected to the propeller shaft 14 by means of suitable locking splines 44. The cage is located axially upon the shaft 14 by means of a thrust nut 46 threaded upon a screw threaded portion of the shaft 14 at the rear end of the cage 42 and which forces the cylindrical sleeve portion 48 of the cage which surrounds the splined portion of the shaft 14 against an oil collector ring 50 surrounding the shaft 14 between the forward end of the cage and an annular shoulder of a radial extension 52 provided upon the shaft 14 immediately rearwardly of the inner race of the bearing 20. The bearing 20 is forced against the opposite annular shoulder of the extension 52 by a suitable thrust nut 54 screw threaded upon a screw threaded portion of the shaft 14 immediately forward of the bearing.

The planetary gears 38 also mesh with gear teeth provided upon a fixed sun gear 56 which is rotatably supported upon a sleeve extension 58 of a fixed member 60. The member 60 is secured to the fixed nose portion 12 by means of the bolts 62 extending through the fixed member, the engine nose section, and the bearing cover 64, the outer race of the bearing 20 being clamped between this fixed member and the bearing cover.

From the above description it will be observed that if the sun gear 56 is maintained stationary and the drive gear 32 caused to rotate, the planetary gears 38 will be rotated and caused to revolve about the sun gear, carrying with them the cage 42 so that the cage and the shaft 14 to which the cage is drivingly connected will be rotated at a speed less than the rotational speed of the drive gear 32 and the power shaft 16. If, on the other hand, the sun gear 56 is allowed to rotate freely, the planetary gears 38 will be caused to rotate but will not impart any motion to the cage, since the only effect of their rotation will be to rotate the sun gear. Also with the sun gear free to rotate, the cage 42 may rotate without rotating the drive gear 32. From the relation of the parts, it is also obvious that the force required to hold the sun gear fixed is less than the force exerted by the planetary gears upon the cage 42 or by the drive gear 32 upon the planetary gears. Therefore, the sun gear is inherently the easiest of the various gear elements to control.

Figure 2:
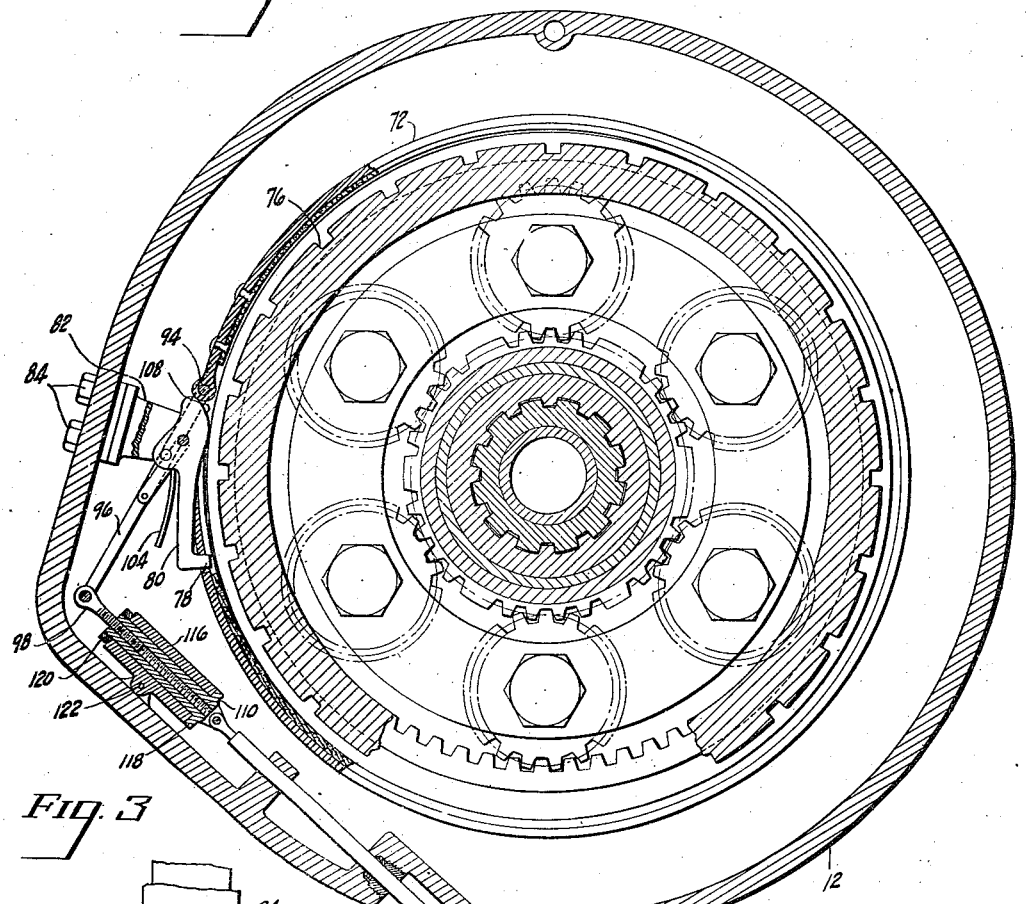
Fig. 2 is a sectional view on the line 2—2 of Fig. 1.

In order to provide for holding the sun gear fixed or allowing it to rotate freely upon its bearing member 58, this sun gear is provided with a radial flange portion 66 connected at its outer edge to an annular portion, generally indicated at 68, which overlies the planetary gears 38 and a portion of the drive gear 32. A part 70 of the annular portions 68 is formed as a brake drum, and about this drum there is applied a flexible brake band 72. Another part, 74, of the annular portion 68 is formed as one portion of a dog clutch and is provided with a series of spaced notches or indentations 76 particularly illustrated in Fig. 2, which notches receive the pin or lug portion 78 of a suitable dog 80 for positively locking the sun gear in a fixed condition.

In accordance with the idea of this invention, if the sun gear 56 were free and were rotating under the influence of a propeller rotation in excess of engine rotation and it were desired to bring the sun gear to a fixed condition, the brake band 72 would first be applied to frictionally reduce the speed of the sun gear and bring it substantially to a stop, after which the dog member 80 would be actuated to force the lug 78 into one of the notches 76 to positively hold the sun gear in its fixed condition.

Suitable means have been illustrated for applying the braking action of the brake band 72, but it is to be understood that the invention is in no way limited to the particular mechanism herein illustrated and described, as various forms of brake actuating mechanism could be utilized.

Figure 3:
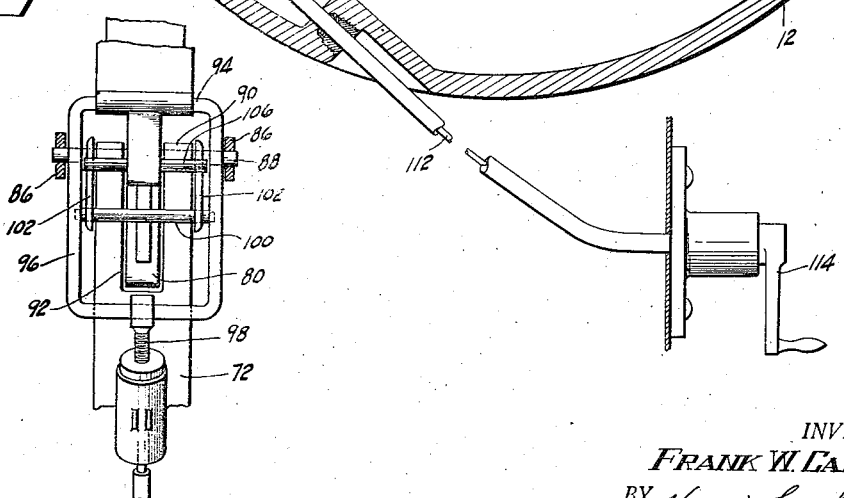
Fig. 3 is a side elevational view of the brake operating mechanism illustrated in Fig. 2.

In the form of brake actuating mechanism illustrated, a bifurcated lug member 82 is rigidly secured to the interior of the fixed nose portion 12 by suitable means, such as cap screws 84. This member is provided with two inwardly extending lug portions indicated at 86 in Fig. 3, which extend upon opposite sides of the brake band 72 and are there apertured to receive a through pin 88. One end of the brake band 72 is anchored to the pin 88 as indicated at 90 in Fig. 3, and the dog member 80 is also pivotally supported upon the pin 88 and is positioned in a slot or aperture 92 provided in the anchored end of the brake band. The opposite end of the brake band is secured, as indicated at 94, to one end of a loop member 96, the opposite end of which is connected to one element 98 of a screw mechanism, the construction and purpose of which will be presently described. The loop member 96 is provided intermediate its length with a cross bar 100 upon which toggle links 102 are pivotally mounted adjacent the ends of the cross bar, the opposite ends of the toggle links being secured to the pin 88 extending through the end 90 of the brake band.

From the above description it will be observed that a downward pull on the end of the loop member connected to the screw 98 will move the end 94 of the brake band toward the fixed end 90 by reason of the decrease in angularity between the loop member and the toggle links.

As stated above, the dog member 80 is also pivotally mounted upon the pin 88. This dog member is provided with a leaf spring 104 which extends under the cross bar 100 so that as the loop member 96 is moved downwardly the cross bar will come in contact with the upper surface of the spring and resiliently urge the lug 78 of the dog member 80 into one of the notches 76. Near its pivotal mounting the dog member is provided with a fixed pin 106 which extends outwardly from each side of the dog member so that its ends overlie the toggle links 102 so that when the loop member 96 is moved upwardly the upper surface of the toggle links will come in contact with the end portions of this pin and force the hook portion of the dog member out of engagement in the notch 76 with which it has been engaged to lock the sun gear. A portion of the dog member 80 extends beyond the mounting pin 88 on the side opposite the hook or lug portion 78 and is there provided with a cam 108 which bears against the movable end 94 of the brake band so that as the dog member is moved upwardly by the pin 106 the cam 108 will act against the end 94 of the brake band to move that end of the brake band away from the fixed end 90 and thus release the brake band from the brake drum 70.

The screw member 98 is externally screw threaded and is received in a screw threaded bore provided in a rotatable member 110, one end of which is operatively connected with the rotatable element 112 of a flexible cable member such as a bowden wire. The opposite end of the member 112 is operatively connected to a crank 114 mounted upon some fixed portion of the airplane where it is accessible to the operator of the airplane. The member 110 is rotatably mounted in a sleeve 116 and is maintained against axial movement with respect to the sleeve by means of a shoulder or flange 118 at one end thereof and a thrust nut 120 at the opposite end. The sleeve 116 is secured to the inner wall of the fixed nose section 12 by means of a suitable pivotal connection 122 arranged to allow a limited tilting movement of the entire screw mechanism so that the end of the screw 98 can follow the end of the loop member 96 without undue resistance.

From the above description it will be observed that the operator of the airplane may lock or release the sun gear 56 by manual operation of the crank 114. In locking the sun gear the action is to first bring the rotating sun gear substantially to a stop by application of the brake band 72 and then to force the lug of the dog member 80 into two of the notches 76 to positively retain the sun gear against movement. In releasing the sun gear the dog member 80 is first removed from its engagement in the notch 76 by the upward movement of the loop member 96 during which time the tension on the brake band 72 is only slightly decreased. After the latch member has been released, a further upward movement of the loop member releases the brake band and allows the sun gear to rotate freely so that the propeller may rotate freely with respect to the engine.

As stated above, the propeller 22 is a controllable pitch propeller operated in one direction by the action of centrifugal force upon the counterweights 30 and operated in the other direction by the introduction of hydraulic fluid under pressure into the hydraulic mechanism 28. The hydraulic fluid is supplied to the hydraulic mechanism from a suitable source of pressure, such as an engine driven pump, and flows through a manually adjustable speed controlling governor 124. From the governor the fluid flows through the conduits 126 and 128 to the oil collector ring 50, the inner end of the conduit 128 being anchored in the fixed member 60. The oil collector ring is provided with oil seal rings 130 and with an aperture 132 which extends from the end of the conduit 128 between the oil seal rings 130 through the oil collector ring 50 and connects with a similar aperture 134 leading through the wall of the hollow shaft 14 to the interior of the shaft. Adjacent to the inner end of the aperture 134, a plug 136 is mounted in the bore of the shaft 14 so that the hydraulic fluid flowing into the shaft will be forced to flow through the forward portion of the hollow shaft to the hydraulic mechanism 28.

The movable propeller blades 24 are provided with suitable limit stops which limit their rotational movement to a certain predetermined angular range. One of the stops is adjusted to provide the angle of pitch adjustment most advantageous for reducing the drag of the propeller when permitted to rotate freely with respect to the engine. A high pitch setting of approximately 50 degrees has been found to be useful for this purpose. The other stop may, if desired, be adjusted to provide the most advantageous pitch angle for increasing the drag of the propeller when allowed to rotate freely with respect to the engine, so that, if desired, the propeller may be used for a brake to slow down the speed of the airplane during landing or a prolonged dive. A low pitch setting of approximately 5 degrees has been found desirable for the purposes indicated.

According to present ideas, the principal advantage of the element resides in the fact that if one engine of a multi-engine airplaine is stopped either voluntarily or because of engine failure, the resistance of the propeller driven by that engine may be reduced to a negligible value by allowing the propeller to rotate freely with respect to the engine at a relatively high pitch angle without, however, providing a range of pitch adjustment sufficient to place the propeller blades in a feathered condition.

While there has been illustrated and described a particular mechanical embodiment of the idea of the invention, it is to be understood that the invention is not limited to the particular mechanical embodiment so illustrated and described, but that such changes in the size, shape, and arrangement of parts may be resorted to as come within the scope of the appended claim.

Having now described the invention so that others skilled in the art may clearly understand the same, what it is desired to secure by Letters Patent is as follows.

What is claimed is:

In combination with a propeller driving engine and a controllable pitch propeller having its blades rotatable for pitch changing adjustment within a range of pitch angles of from approximately five degrees at low pitch to approximately fifty degrees at high pitch, means providing a manually releasable driving connection between said engine and said propeller whereby said propeller may rotate freely with respect to said engine under the influence of aerodynamic forces, a means for maintaining said propeller in either its positive high pitch or positive low pitch condition during such free rotation.

FRANK W. CALDWELL.